US012491611B2

(12) United States Patent
Verkley

(10) Patent No.: US 12,491,611 B2
(45) Date of Patent: Dec. 9, 2025

(54) BIT DRIVER AND METHOD FOR ITS USE

(71) Applicant: Steven Gerard Verkley, Harrison, OH (US)

(72) Inventor: Steven Gerard Verkley, Harrison, OH (US)

( * ) Notice: Subject to any disclaimer, the term of this patent is extended or adjusted under 35 U.S.C. 154(b) by 481 days.

(21) Appl. No.: 16/105,719

(22) Filed: Aug. 20, 2018

(65) Prior Publication Data

US 2019/0076998 A1 Mar. 14, 2019

Related U.S. Application Data

(60) Provisional application No. 62/556,652, filed on Sep. 11, 2017.

(51) Int. Cl.

| | |
|---|---|
| ***E21C 35/19*** | (2006.01) |
| ***B25B 27/02*** | (2006.01) |
| ***B25B 27/04*** | (2006.01) |
| ***B25D 1/00*** | (2006.01) |
| *E21C 35/18* | (2006.01) |

(52) U.S. Cl.

CPC .............. *B25B 27/02* (2013.01); *B25B 27/04* (2013.01); *B25D 1/00* (2013.01); *E21C 35/18* (2013.01)

(58) Field of Classification Search

CPC ........... B25B 27/02; B25B 27/04; B25D 1/00; E21C 35/18; E21C 35/197; E21C 35/183; E02D 7/04; E02F 9/2891; B28D 1/188

See application file for complete search history.

(56) References Cited

U.S. PATENT DOCUMENTS 1,321,272 A * 11/1919 Jurich ...................... E21B 7/005 175/219
3,391,842 A * 7/1968 Mathes ...................... B25C 1/02 24/339
3,397,012 A * 8/1968 Krekeler ............... E21C 35/197 299/104

(Continued)

FOREIGN PATENT DOCUMENTS

CN 105058323 A * 11/2015
WO WO-9631681 A1 * 10/1996 ............. E21C 35/19

OTHER PUBLICATIONS

Xia Yanguang, CN-105058323-A Machine translation (Year: 2015).*

(Continued)

*Primary Examiner* — Lee A Holly
(74) *Attorney, Agent, or Firm* — Daniel F. Nesbitt; Nesbitt IP LLC

(57) ABSTRACT

A bit driver for a cutting bit having an elongated body configured for being grasped by a user, and a lower end having a distal face. A shaped cavity is formed into the distal face, extending into the elongated body, and has one or more sections, each having a tapered annular surface that is configured to conform to an outer surface of a bit end of a conventional cutting bit. The tapered annular surface holds the cutting bit aligned along an axis of the elongated body. The bit driver also includes a driving end opposite the lower end having a target surface that has a diameter or average effective dimension larger than the diameter of the elongated body. The driving end receives an impact delivered by a hammer to insert the base end of the cutting bit into a receptacle bore of a cutting bit holder or cutting equipment.

17 Claims, 4 Drawing Sheets

(56) References Cited

U.S. PATENT DOCUMENTS

| | | | | | |
|---|---|---|---|---|---|
| 3,757,409 | A * | 9/1973 | Flanigan | E21B 19/18 | 299/79.1 |
| 3,769,683 | A * | 11/1973 | Krekeler | E21C 35/183 | 29/267 |
| 3,865,437 | A * | 2/1975 | Crosby | E21C 35/197 | 299/107 |
| 4,329,766 | A * | 5/1982 | Leonard | E02F 9/2891 | 299/95 |
| 5,529,234 | A * | 6/1996 | Juneau | B25C 1/02 | 227/147 |
| 5,582,468 | A * | 12/1996 | Latham | E21C 35/18 | 299/106 |
| 5,775,781 | A * | 7/1998 | Sawtelle | B28D 1/188 | 299/39.9 |
| 5,884,979 | A * | 3/1999 | Latham | E21C 35/18 | 299/106 |
| 6,371,567 | B1 * | 4/2002 | Sollami | B28D 1/188 | 299/110 |
| 6,526,641 | B1 * | 3/2003 | Latham | B25B 27/026 | 254/18 |
| 7,117,955 | B2 * | 10/2006 | Rivers | E02D 7/04 | 173/171 |
| 7,401,862 | B2 * | 7/2008 | Holl | B28D 1/188 | 299/39.6 |
| 7,997,661 | B2 * | 8/2011 | Hall | E21C 35/183 | 299/105 |
| 2004/0174065 | A1 * | 9/2004 | Sollami | E21C 35/18 | 299/106 |
| 2015/0107418 | A1 * | 4/2015 | Perry | B25G 1/10 | 81/26 |
| 2017/0173770 | A1 * | 6/2017 | Verkley | B25B 27/023 | |

OTHER PUBLICATIONS

Xia Yanguang et al. (CN 105058323 A) Machine Translation (Year: 2015).*

Xia, CN-105058323-A Machine Translation (Year: 2015).*

Kammerer, WO-9631681-A1 Machine Translation (Year: 1996).*

National Association of City Transportation Officials Urban Street Design Guide (Year: 2017).*

* cited by examiner

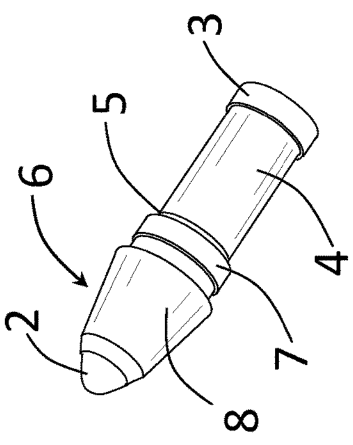
Figure 1 – Prior Art
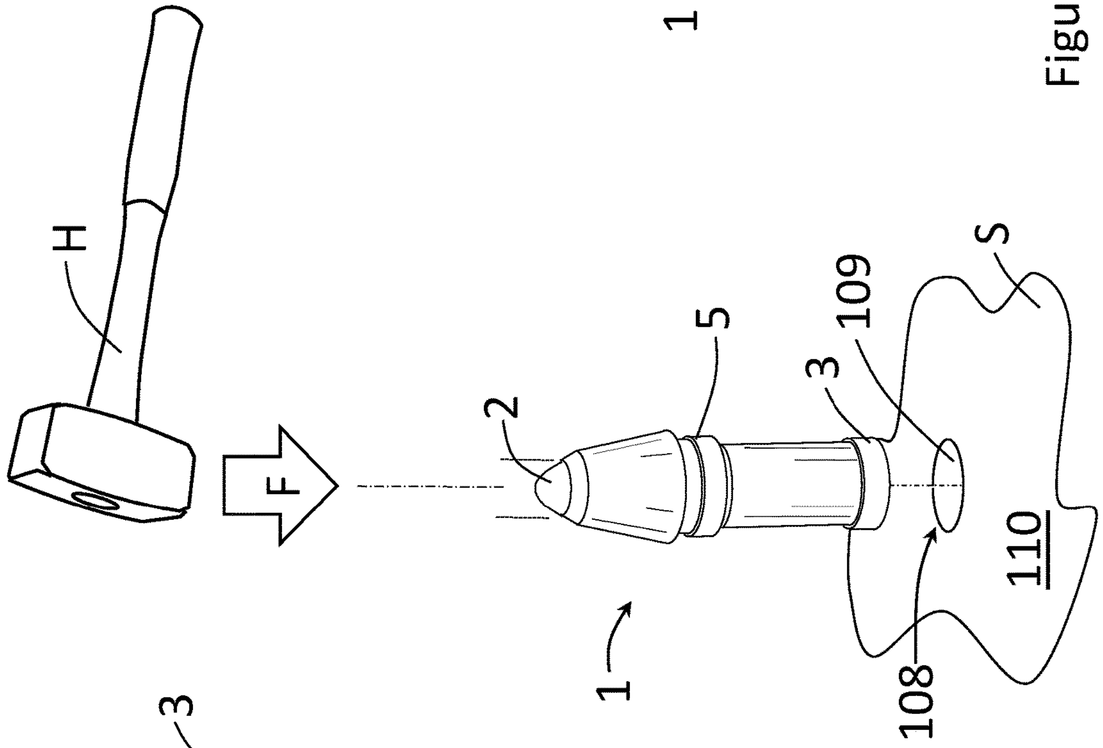
Figure 2a – Prior Art
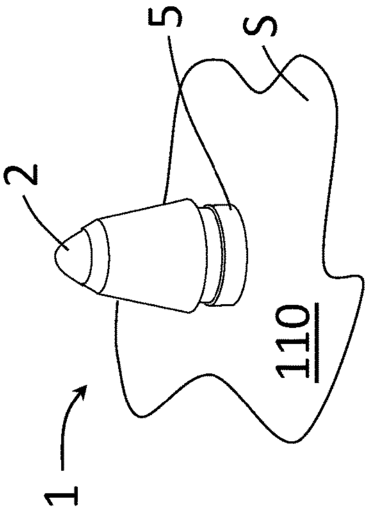
Figure 2b – Prior Art

BIT DRIVER AND METHOD FOR ITS USE

CROSS-REFERENCE TO RELATED APPLICATION

This application claims the benefit of U.S. Provisional Patent Application No. 62/556,652, filed on Sep. 11, 2017, the disclosure of which is incorporated herein by reference.

FIELD OF THE INVENTION

The present invention generally relates to a tool for inserting cutting bits used in a cutting equipment, such as a roadway reclaiming equipment or an auger.

BACKGROUND OF THE INVENTION

Cutting bits are used in the heavy construction industry to cut and bore through rock and earth in the construction of highways, bridges, tunnels, dams and buildings of all types. Typical roadway surface reclaiming machines disclosed in the prior art include rotary driven cylindrical drums with holders holding fixed one or more cutting bits which scarify and mine the top portion of an asphaltic road surface. Conventional cutting bits can have. An alloy steel body that is heat-treatment hardened for high toughness and durability, and a tungsten carbide tip.

While several styles of drums have been employed, at least some styles have included an array of cutting bit holders fixed usually by a peripheral weld to the drum surface. Replaceable cutting bits are received within the cutting bit holders which can be periodically replaced as needed. Examples of prior art cutting bit holders are to be found, as non-limiting examples, in U.S. Pat. Nos. 3,865,437, 5,884,979, 5,582,468 and 5,098,167, the disclosures of which are incorporated by reference in their entireties. Other examples appear as the prior art cited in these patents.

During the operation of such roadway surface reclaiming machines, the cutting bits are exposed to extreme frictional and impact forces. Although these bits, described above, are typically manufactured from hardened materials, wear and damage to the cutting bits is inevitable. As the cutting bits wear, the efficiency of the equipment that relies upon them is reduced, slowing the reclamation process and increasing the burdens imposed upon the cutting bit holders, the cutting drums and the equipment that drives these devices. This leads to delay and increased costs for additional maintenance and labor.

However, typical road surface reclamation devices use a large number of cutting bits, thus, the replacement of the cutting bits is a time consuming process, largely because the manual removal and reinstallation cutting bits is often tedious and slow. Thus, replacement of the bits is expensive, both requiring the extended attention of one or more trained mechanics, and because all road reclamation operations must cease during replacement of the cutting bits. When circumstances dictate that cutting bits must be replaced during regularly scheduled reclamation activities, hundreds of labor hours can be lost.

Various tools are described for use in removing a cutting bit from its cutting bit holder or directly from the cutting equipment in a time effective manner. For example, U.S. Pat. No. 6,526,641, the disclosure of which is incorporated by reference, describes a tool for extracting cutting bits that employs a retractor device using a fluid-powered cylinder, where the can be a pneumatic or hydraulic fluid. US Patent Publication 2017-0173770, the disclosure of which is incorporated by reference, describes a device for extracting a cutting bit. The device has a base body having an open base end that contact the cutting equipment that surrounds the cutting bit. An elongated drive body having a threaded member with a threaded bore, rotatively contacts the base body, and a threaded post having a threaded portion is threaded within the threaded bore of the elongated drive body, and has a lower end extending into the base body. A pair of bit jaws are attached to the lower end of the threaded post, each having an in-turned ledge for engaging a peripheral groove of the cutting bit. By rotating the drive body, the threaded post is drawn axially upwardly, and with it the pair of bit jaws, to withdraw the cutting bit from the hole in the cutting equipment.

Once a damaged or used cutting bit has been removed from the cutting equipment, a new cutting bit is inserted into the cutting equipment. A conventional means for inserting an cutting bit into a receptacle bore in a cutting equipment or tool involves placing a base end of the cutting bit, held by hand, over the opening of the receptacle bore, and driving the cutting bit into the receptacle bore using a hammer, by striking the head of the hammer onto the cutting tip of the cutting bit until the shoulder of the cutting bit seats onto the tool surface around the receptacle bore. Several severe blows of a head of a hammer onto the cutting tip are needed to drive it fully into the receptacle bore. This method of inserting a cutting bit can cause injury, since the bit is usually held in position for striking by a hand or fingers. Also, striking the head of the hammer onto the hardened cutting bit, and particularly onto the carbide tip, can dimple and damage the head of the hammer so badly that shards of steel can be thrown off the hammer head and into the air, possibly causing injury. And, striking the head of the hammer onto the carbide cutting tip may cause micro fracture damage to the cutting tip of the bit.

Accordingly, a need remains for an effective tool for inserting a cutting bit into a cutting bit holder of the cutting equipment in a time effective and safe manner, while reducing the risk of damage to the cutting bit, the cutting bit holder, and the cutting equipment.

SUMMARY OF THE INVENTION

The present invention provides a device and a method for inserting a cutting bit into a receptacle bore of a cutting bit holder or directly into a cutting equipment. The device and method avoid striking directly the cutting tip of the cutting bit. The device and method provide for more striking or hammering force with less risk of injury and less risk of glancing-blows that can injury or damage the cutting bit holder or cutting equipment, and better stability and control of the positioning and alignment of the cutting bit as it is being hammered into the receptacle bore.

An embodiment of the invention provides a bit driver for a cutting bit, including: an elongated body configured for being grasped by a user; a lower end having a distal face, with a shaped cavity in the distal face extending into the elongated body, the shaped cavity having one or more sections of a tapered annular surface that is configured to conform to an outer surface of a bit end of a conventional cutting bit, to hold the cutting bit aligned along an axis of the elongated body; and a driving end opposite the lower end, including a target surface having a diameter or surface area, larger than that of the elongated body, and configured for receiving an impact delivered by the hammer.

Another embodiment of the invention provides a method for inserting a cutting bit into a holder tool or cutting equipment, comprising the steps of: providing a cutting bit having a base end, and a bit end having an tapered surface and a cutting tip; providing a cutting bit holder or cutting equipment having a receptacle bore configured for securing the cutting bit; aligning a base end of a cutting bit with an opening of the receptacle bore of the cutting bit holder or cutting equipment; positioning the bit end of the cutting bit into the shaped cavity of a bit driver according to the invention, with the tapered surface of the cutting bit conformed to the one or more tapered annular surfaces of the shaped cavity; and hammering the driving end of the bit driver, to insert the base end of the cutting bit into the receptacle bore.

BRIEF DESCRIPTION OF THE DRAWINGS

FIG. 1 shows a cutting bit of the prior art.

FIG. 2*a* shows a conventional method of inserting a cutting bit into a receptacle bore of a cutting tool.

FIG. 2*b* shows the conventional method, with the cutting bit inserted into the receptacle bore of the cutting tool.

DETAILED DESCRIPTION OF THE INVENTION

Figure 4:
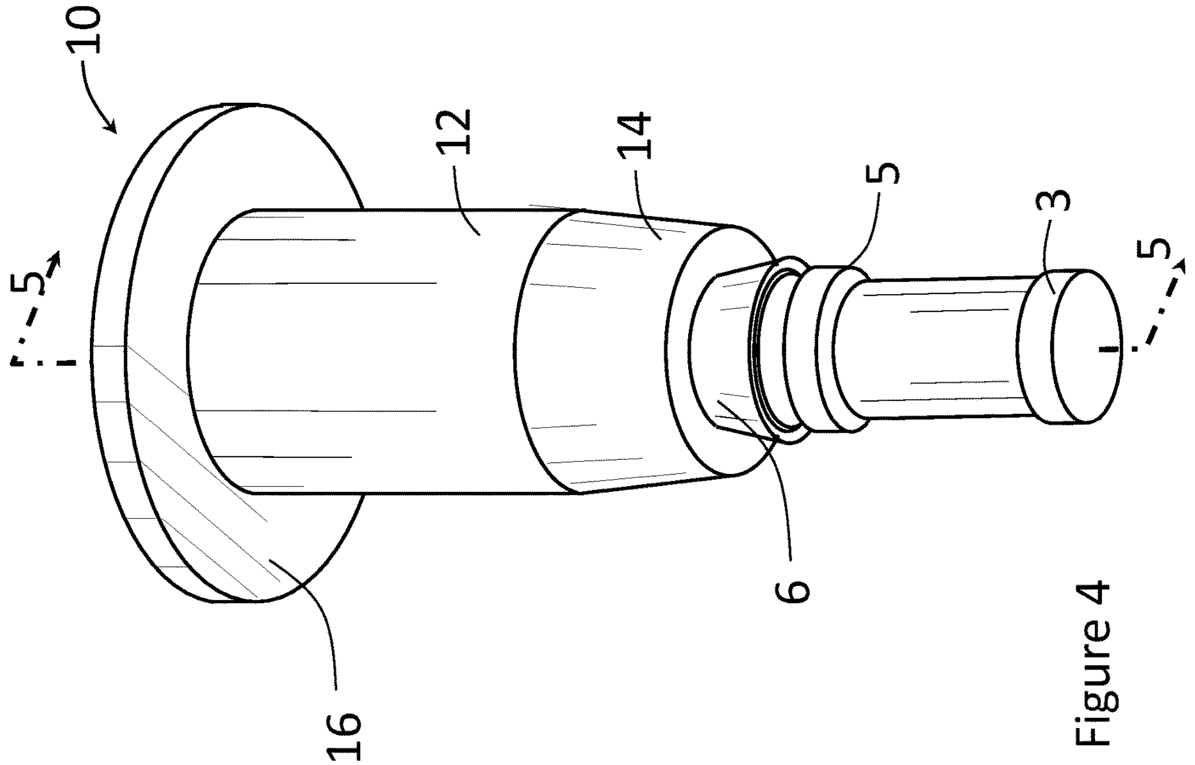
FIG. 4 shows a bit end of the cutting bit positioned into the bit driver.

FIG. 1 shows a cutting bit 1 of the prior art, having an elongated cylindrical body 4 with a base end 3 and a bit end 6 having a cutting tip 2. A shoulder 5 separates the body 4 and the bit end 6, having a peripheral diameter 7.

FIG. 2*a* shows a conventional means for inserting a cutting bit 1 into a receptacle bore 109 in a cutting bit holder (or cutting equipment) 110. The base end 3 of the cutting bit 1 is held, usually by hand, over the opening 108 of the receptacle bore 109, and a user drives by force the cutting bit 1 into the receptacle bore 109 using a hammer, by striking the head of the hammer onto the cutting tip 2, until the shoulder 5 seats onto the tool surface around the opening 108, as shown in FIG. 2*b*.

Figure 3:
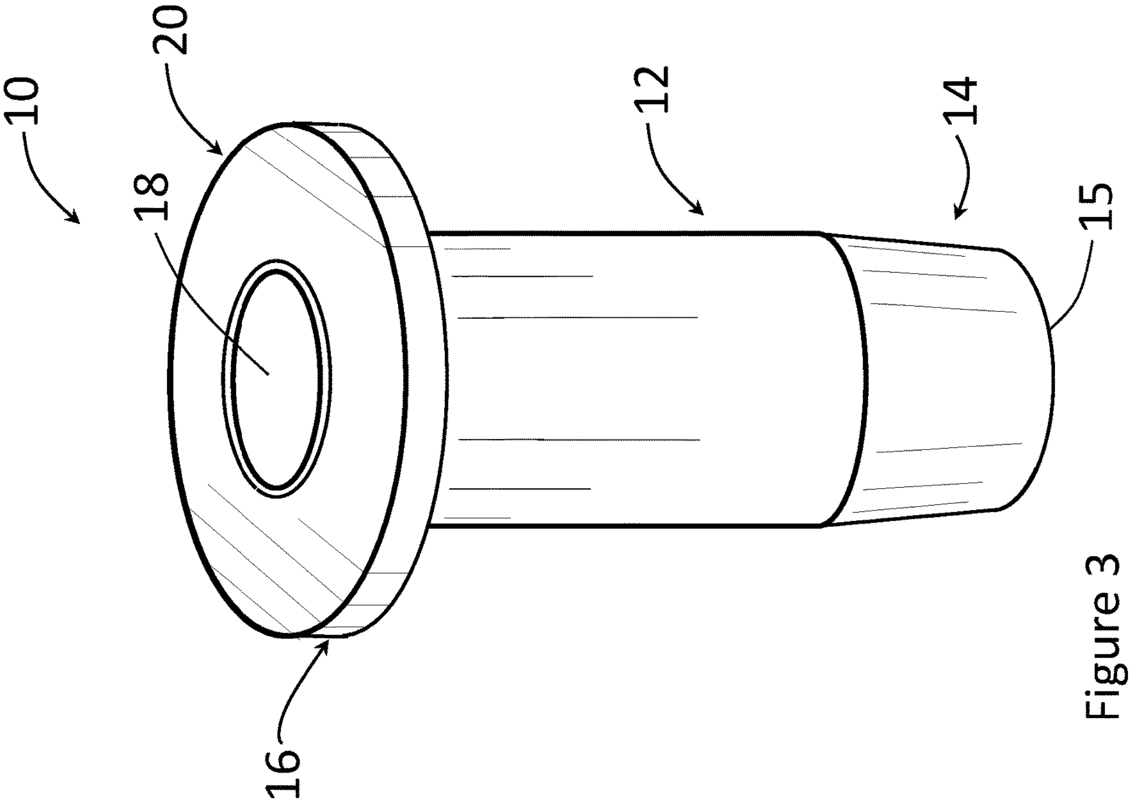
FIG. 3 shows a bit driver of the present invention.

FIG. 3 shows a bit driver 10 having an elongated body 12 extending to a base end 14 that has a shaped cavity 30 in the distal face 15, the cavity 30 configured and shaped to hold and stabilize the bit end 6 of a cutting bit 1. The cavity extends along an axis 100 and is machined or shaped with one or more sections having annular surfaces 32*a*, 32*b*, 32*c* that taper inwardly, from the distal face 15, to a tip end 34. The tapered annular surfaces 32*a*, 32*b*, 32*c* are configured to conform to or engage with an outer tapered surface 8 of the bit end 6 of a conventional cutting bit 1, and to hold the cutting bit 1 aligned along the axis 100. Preferably, no portion of the inside surface of the bit driver 10 contacts the cutting tip 2 of the cutting bit 1. Each of the tapered annular surfaces 32 can have a different curved or straight surface taper to accommodate cutting bits having differently-shaped outer tapered surfaces on their bit ends.

The top end 16 of the bit driver 10 includes a larger area, typically a circular area of larger diameter, to provide a striking surface. The elongated body 112 of the bit driver servers as a handle by which a user will grip and hold the bit driver 10. The diameter or area of the top end 16 is typically larger than the diameter or cross-section of the elongated body 112, both to provide a larger target for striking the top end 16 with a hammer H or for another force, and to provide protection to the hand of the user from inadvertent or accidental swings with the hammer that may miss or glance off the target. In the illustrated embodiment, the top end 16 includes a large-area disk 20 that extends radially outward from the top end of the elongated body 12, the disk 20 being of sufficient thickness and material to maintain its form and structure under the force of hammering. Typically the material of the bit driver 10 is a steel or other metal, to retain its shape under the force of a hammering, and to provide weight or mass to assist with the hammering of the cutting bit 1 into the tool T.

In another embodiment, the weight of the bit driver is at least 5 times the weight of the conventional cutting bit, including at least 10 times the weight of the conventional cutting bit.

In another embodiment, the diameter of the driving end is at least 25% larger, including at least 50% larger, than the diameter of the elongated body.

In another embodiment, the surface area of the driving end is at least 50% larger, including at least 100% larger, than the cross-sectional area of the elongated body.

In another embodiment, the diameter of the elongated body is at least 25% larger, including at least 50% larger, than the diameter of the cutting bit.

In another embodiment, the cross-sectional area of the elongated body is at least 50% larger, including at least 100% larger, than the cross-sectional area of the cutting bit.

In another embodiment, the length of the elongated body is at least 50% greater than the diameter of the elongated body, including at least 100% larger, and at least 150% greater, than the diameter of the elongated body.

In the illustrated embodiment of FIG. 4, the top end 16 comprising the disk 20 can be secured permanently to the elongated body by welding. The disk 20 can be made with an opening in the center portion defined by a rim 28. The opening 21 receives a similarly-shaped projection 24 formed in the top end of the elongated body 12, with the underside of the rim 28 resting on a shoulder 22 the surrounds and defines the projection 24. The disk member 20 can be welded to the projection 24 to stabilize and unitize the tool.

Figure 6:
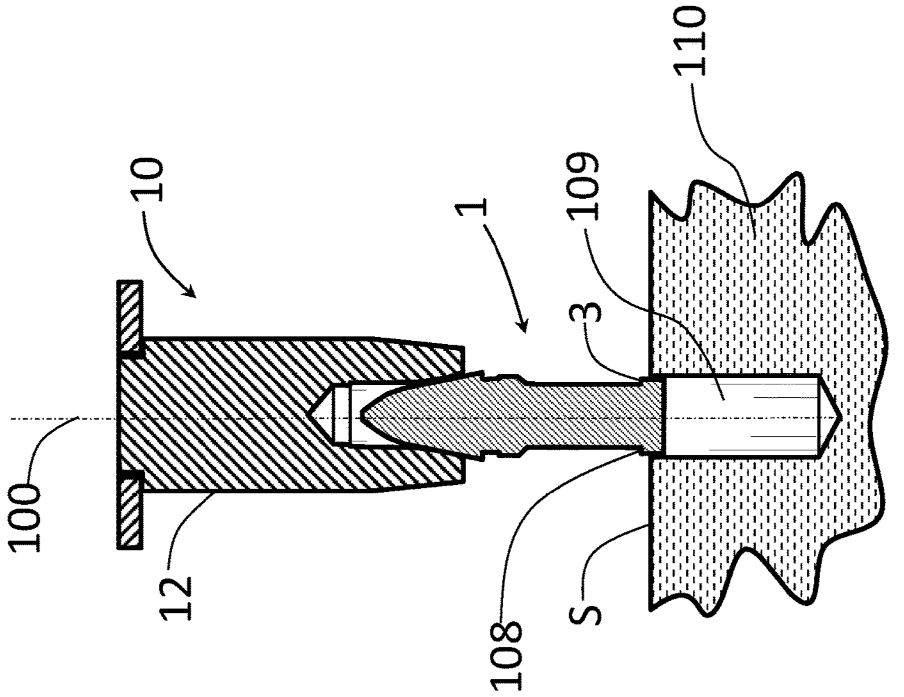
FIG. 6 shows a user holding the bit driver along an axis line through a receptacle bore in the surface of a cutting bit holder, with the cutting bit positioned into the bit driver.
Figure 5:
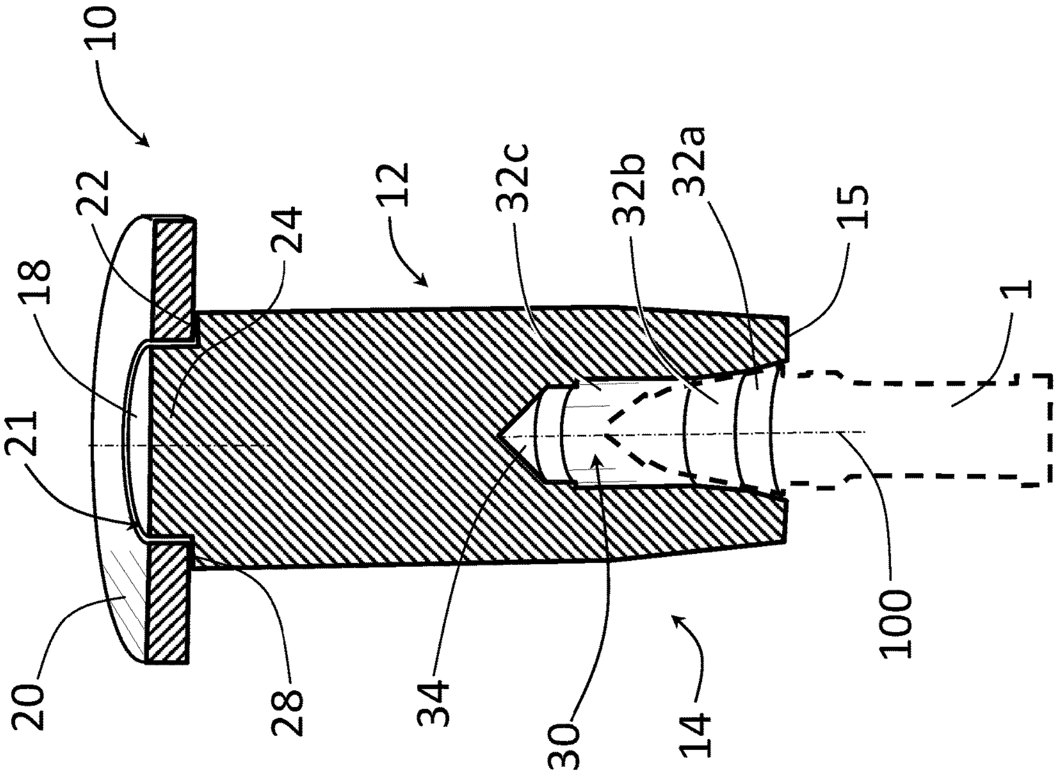
FIG. 5 shows sectional view of the FIG. 4, taken through line 5-5.
Figure 8:
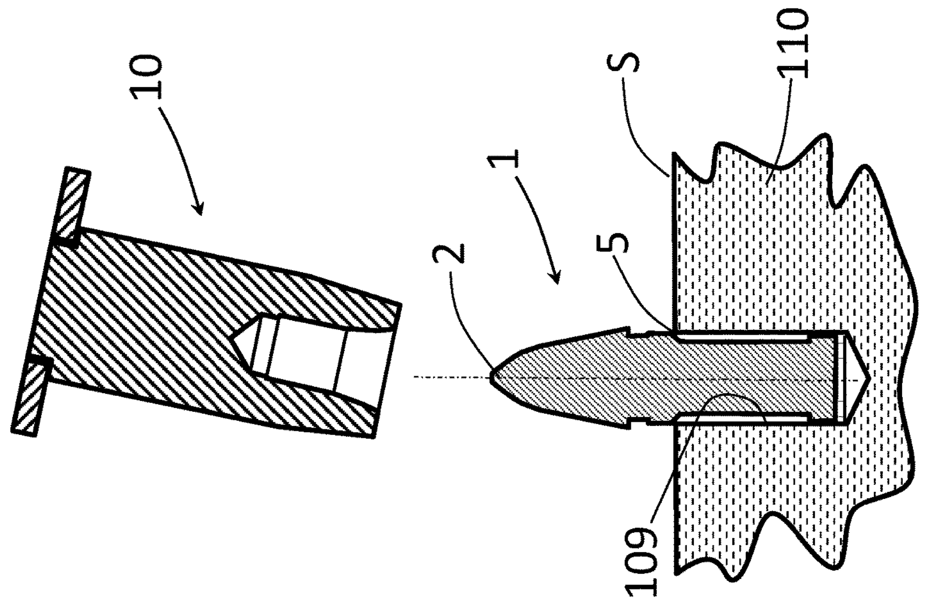
FIG. 8 shows the cutting bit disposed fully into the receptacle bore, and the bit driver removed.
Figure 7:
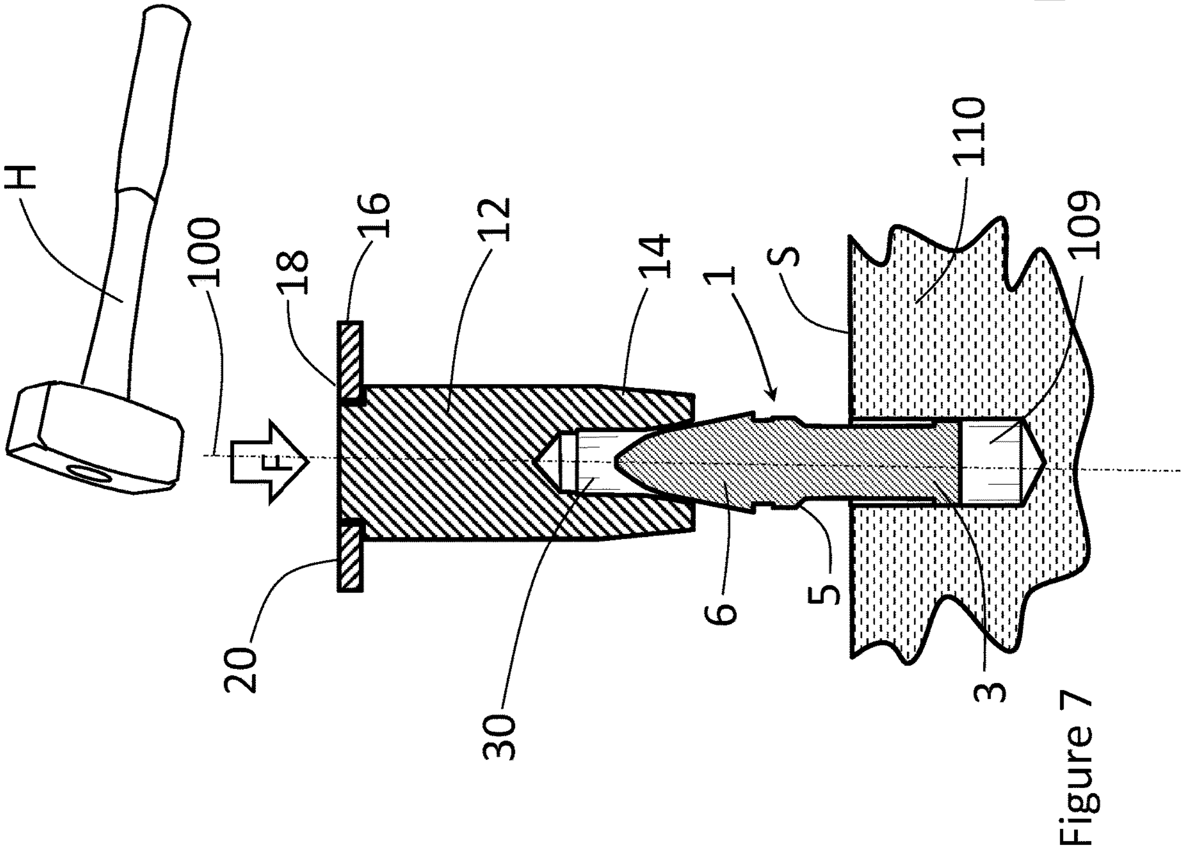
FIG. 7 shows the cutting bit being driven into the receptacle bore in the surface of a cutting bit holder by a hammer striking the aligned bit driver.

FIGS. 4 and 5 show the bit end 6 of a cutting bit 1 positioned into the opening of the shaped cavity 30 of the bit driver 10. Typically a mechanic or technician is holding the bit driver in one hand, and the cutting bit in the other hand. The user then positions the cutting bit 1 and bit driver 10 over the opening 108 of a receptacle bore 109 on the surface S of a cutting bit holder 110, so that the base end 3 of the cutting bit 1 is registered and aligned with the opening 108. The user holds the bit driver 10 along the axis line through the receptacle bore 109 and cutting bit 1, as shown in FIG. 6, and then uses a hammer H or other force applied along the axis line 100. The head of the hammer H strikes the upper end 16 of the bit driver 10, including the center projection 18 and the radially-extending disk 20, which transmits the force down through the body 12 and into the bit end 14, to drive the cutting bit 1 down into the receptacle bore 109, as shown in FIG. 7. The bit driver 10 is then removed, as shown in FIG. 8, the cutting bit 1 disposed fully into the receptacle bore 109.

The bit driver 10 is configured with a larger diameter or area on the driving end 16, to provide a larger target for the blows delivered by the hammer. Since the size of the target 16 is so much larger than the tip 2 of the cutting bit 1, the user can swing harder with greater force, and with greater confidence that the striking force will be transmitted only to the cutting bit 1, and not to the user's hand to the surrounding tool surface, in case of hammer swing in off target or is a glancing-blow off the tip 2 of the cutting bit 1. In addition, the weight and mass of the bit driver 10 aids in keeping the tool aligned with the axis, and inhibits or prevents the bit driver 10 from coming off the cutting bit 1 as a result of a glancing or off-center blow from the hammer H. Typically the bit driver 10 is at least 5, and more typically at least 10, times the weight of the cutting bit, such that the center of mass of the bit driver 10 dominates the mass of the cutting bit.

I claim:

1. A bit driver for use in inserting a cutting bit into a receptacle bore of a tool holder or cutting equipment, the bit driver made of steel or other metal, consisting of:

(A) an elongated body configured for being grasped by a user, the elongated body having an axis and including: (i) a lower end having a distal face, with a shaped cavity in the distal face extending into the elongated body, the shaped cavity having an axis and one or more sections of a tapered annular surface that is configured to conform to an outer surface of a bit end of a conventional cutting bit, to hold the cutting bit aligned along the axis of the elongated body and the axis of the shaped cavity, and (ii) a top end opposite the lower end, the top end including a shaped projection extending from the center of the top end of the elongated body, along the axis of the elongated body, with a peripheral portion of the top end of the elongated body defining a shoulder that surrounds the shaped projection, and (B) a disk secured permanently by welding to the top end of the elongated body, the disk extending radially outward from the top end of the elongated body, the disk having a flat upper surface having a diameter or area target surface larger than a diameter of the elongated body, the disk having an opening that receives the shaped projection of the elongated body, and an underside that surrounds the opening and resting on the shoulder of the elongated body, wherein the shaped cavity of the elongated body is configured to provide that no portion of the inside surface of the tapered annular surface of the bit driver contacts the cutting tip of the cutting bit, and wherein the bit driver is configured for receiving an impact delivered by a hammer applied along the axes of the elongated body and the shaped cavity.

2. The bit driver of claim 1, wherein a weight of the bit driver is at least 5 times a weight of the conventional cutting bit.

3. The bit driver of claim 2, wherein the weight of the bit driver is at least 10 times the weight of the conventional cutting bit.

4. The bit driver of claim 1, wherein the diameter of the disk is at least 25% larger than the diameter of the elongated body, to provide protection to a hand of the user from inadvertent or accidental swings with the hammer that may miss or glance off the target surface of the disk.

5. The bit driver of claim 4, wherein the diameter of the disk is at least 50% larger than the diameter of the elongated body, to provide protection to a hand of the user from inadvertent or accidental swings with the hammer that may miss or glance off the target surface of the disk.

6. The bit driver of claim 1, wherein the target area of the target surface of the disk is at least 50% larger than the cross-sectional area of the elongated body, to provide protection to a hand of the user from inadvertent or accidental swings with the hammer that may miss or glance off the target surface of the top end.

7. The bit driver of claim 6, wherein the surface area of the disk is at least 100% larger than the cross-sectional area of the elongated body, to provide protection to a hand of the user from inadvertent or accidental swings with the hammer that may miss or glance off the target surface of the disk.

8. The bit driver of claim 1, wherein the diameter of the elongated body is at least 25% larger than the diameter of the tapered annular surface at the lower end that conforms to the outer surface of the bit end of the cutting bit.

9. The bit driver of claim 8, wherein the diameter of the elongated body is at least 50% larger than the diameter of the tapered annular surface at the lower end that conforms to the outer surface of the bit end of the cutting bit.

10. The bit driver of claim 1, wherein the cross-sectional area of the elongated body is at least 50% larger than the cross-sectional area of the tapered annular surface at the lower end that conforms to the outer surface of the bit end of the cutting bit.

11. The bit driver of claim 10, wherein the cross-sectional area of the elongated body is at least 100% larger than the cross-sectional area of the tapered annular surface at the lower end that conforms to the outer surface of the bit end of the cutting bit.

12. A method for inserting a cutting bit into a holder tool or cutting equipment, comprising the steps of:

a) providing a cutting bit having a base end, and a bit end having a tapered surface and a cutting tip;

b) providing a cutting bit holder or cutting equipment having a receptacle bore configured for securing the cutting bit;

c) aligning a base end of a cutting bit with an opening of the receptacle bore of the cutting bit holder or cutting equipment;

d) positioning the bit end of the cutting bit into the shaped cavity of a bit driver according to claim 1, with the tapered surface of the cutting bit conformed to the one or more tapered annular surfaces of the shaped cavity;

e) providing a hammer with a head and a handle; and f) swinging the head of the hammer by the handle to strike the flat upper surface of the disk of the bit driver along the axis of the elongated body and the axis of the shaped cavity of the bit driver, to insert the base end of the cutting bit into the receptacle bore.

13. The method according to claim 12, wherein the step of positioning the bit end of the cutting bit into the shaped cavity of the bit driver comprises aligning an axis of the cutting bit along the axis of the elongated body, and the step of hammering includes holding the axis of the elongated body along an axis of the receptacle bore of the cutting bit holder or cutting equipment.

14. The bit driver of claim 1, wherein the top end of the elongated body further comprises a shaped projection along the axis of the elongated body that is surrounded by a shoulder; and the disk has an opening that receives the shaped projection, and an underside resting on the shoulder of the elongated body.

15. The bit driver of claim 1, wherein the material of the bit driver is a steel or other metal, and wherein the disk is secured permanently to the top end of the elongated body by welding.

16. The bit driver of claim 15, wherein the top end of the elongated body further comprises a shaped projection along the axis of the elongated body that is surrounded by a shoulder, and the disk has an opening that receives the shaped projection, and an underside resting on the shoulder of the elongated body.

17. The bit driver of claim 1, wherein the shaped cavity is configured to provide that no portion of the inside surface of the tapered annular surface of the bit driver contacts the cutting tip of the cutting bit.

* * * * *